United States Patent [19]

Werner

[11] Patent Number: 5,044,781
[45] Date of Patent: Sep. 3, 1991

[54] SPRING SUPPORTED DAMPING SYSTEM
[75] Inventor: Malcolm J. Werner, Minden, Nebr.
[73] Assignee: United Technologies Corporation, Hartford, Conn.
[21] Appl. No.: 560,984
[22] Filed: Jul. 26, 1990
[51] Int. Cl.$^5$ ............................................. F16C 39/04
[52] U.S. Cl. .................................................. 384/99
[58] Field of Search ................. 384/99, 548, 583, 535, 384/495, 558

[56] References Cited

U.S. PATENT DOCUMENTS

| | | |
|---|---|---|
| 3,679,272 | 7/1972 | Costa et al. ............................ 384/99 |
| 3,782,793 | 1/1974 | Sinner .................................... 384/99 |
| 4,669,893 | 6/1987 | Chalaire et al. ...................... 384/99 |
| 4,872,767 | 10/1989 | Knapp .................................... 384/99 |

Primary Examiner—Lenard A. Footland
Attorney, Agent, or Firm—Norman Friedland

[57] ABSTRACT

A damper system for supporting a bearing for a rotating shaft of a gas turbine engine includes a plurality of cylinders circumferentially spaced about the outer race of the bearing with a reciprocating piston in each of the cylinders having one face bearing against the outer race and the other face disposed in a fluid-filled chamber with an inlet and restricted outlet that forces the liquid in and out of the chamber in response to the vibratory motion as the outer race orbits about the cylinders exciting the piston to effectuate a pumping action.

13 Claims, 4 Drawing Sheets

SPRING SUPPORTED DAMPING SYSTEM

The invention was made under a U.S. Government contract and the Government has rights herein.

CROSS REFERENCE

The subject matter of this application is related to the subject matter of commonly assigned U.S. patent application Ser. No. 07/560,985 filed on even date herewith and entitled "Dashpot Damper".

FIELD OF THE INVENTION

This invention relates to dampers for bearings supporting a rotating shaft of rotating machinery and more particularly to dashpot dampers for bearings supporting the shaft of the compressor/turbine rotor of a gas turbine engine.

BACKGROUND OF THE INVENTION

U.S. Pat. No. 4,213,661 granted to R. A. Marmol on July 22, 1980 and entitled "Bearing Support Structure Combining Fluid Damping and Spring Damping Apparatus" assigned to United Technologies Corporation, the assignee common to this patent application discloses a fluid damper and arcuate spring damper combination. In the structure disclosed in the patent, supra, seals isolate the ends of the fluid filled damping chamber to form a tight compartment for the oil to effectuate damping. U.S. patent application Ser. No. 07/417,108 filed on Oct. 4, 1989 by R. Carlson and entitled "Fluid Damper And Spring" similarly assigned to United Technologies Corporation discloses a spring that is fabricated from arcuate segments that when assembled surround the bearing and include a plurality of circumferentially spaced oil filled chambers entrapped by a "race track" shaped "O" ring seal also effectuating damping. While these systems, just described above, provide efficacious damping, they nonetheless present certain problems. As for example, the curved beam springs are manufactured to extremely close tolerances which is expensive and are difficult to assemble. In addition, these components are highly stressed and are subjected to wear which are at magnitudes that in certain installations may be intolerable. The "race track" shaped groove for the "O" ring seal is prone to seal blowout. Under adverse circumstances or poor assembly practices the seal can become extruded from the groove and get pinched between the beam and its housing with a consequential destruction of the seal and a subsequent loss of oil and its attendant damping capability.

I have found that I can obviate the problems noted hereinabove by providing a dashpot damper system that is judiciously mounted around the outer race of the bearing supporting the rotor shaft of the gas turbine engine.

SUMMARY OF THE INVENTION

An object of this invention is to provide an improved damping and spring support system for the rotor of rotating machinery.

A feature of this invention is to provide for a gas turbine engine a plurality of circumferentially spaced dashpots each of which includes a piston surface that bears against the outer surface of the outer race of the bearing supporting the rotor shaft which is characterized as being simple to manufacture, relatively inexpensive, is flexible in design as to preloads, spring rate, spring response, seal types, contact area and damping volume. Additionally, the seal for the fluid-tight cavity of the dashpot is ideally located inasmuch as it avoids the extrusion problem alluded to hereinabove.

BEST MODE OF CARRYING OUT THE INVENTION

While in its preferred embodiment, the invention is contemplated to be utilized on a radial bearing for gas turbine engines, it will be understood that the invention can also be employed with other types of bearings and for any rotating machinery where it is desired to minimize the effect of adverse vibrating motion. For additional details relative to damping systems used in gas turbine engines reference should be made to the U.S. Pat. No. 4,213,661, supra.

Figure 1:
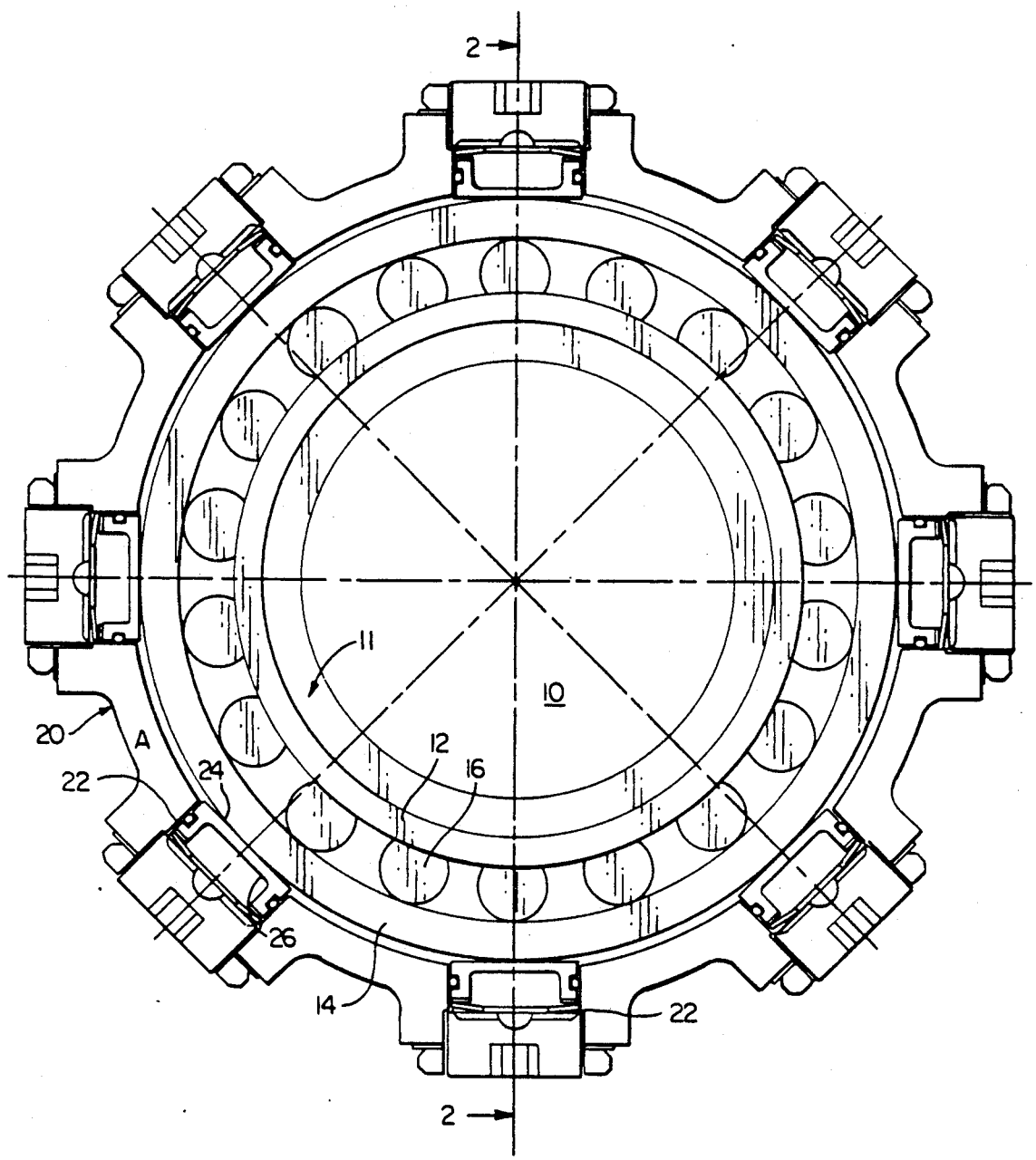
FIG. 1 is a sectional view taken along lines 1—1 of FIG. 2 showing the details of the inventive spring supported dashpot damper.
Figure 2:
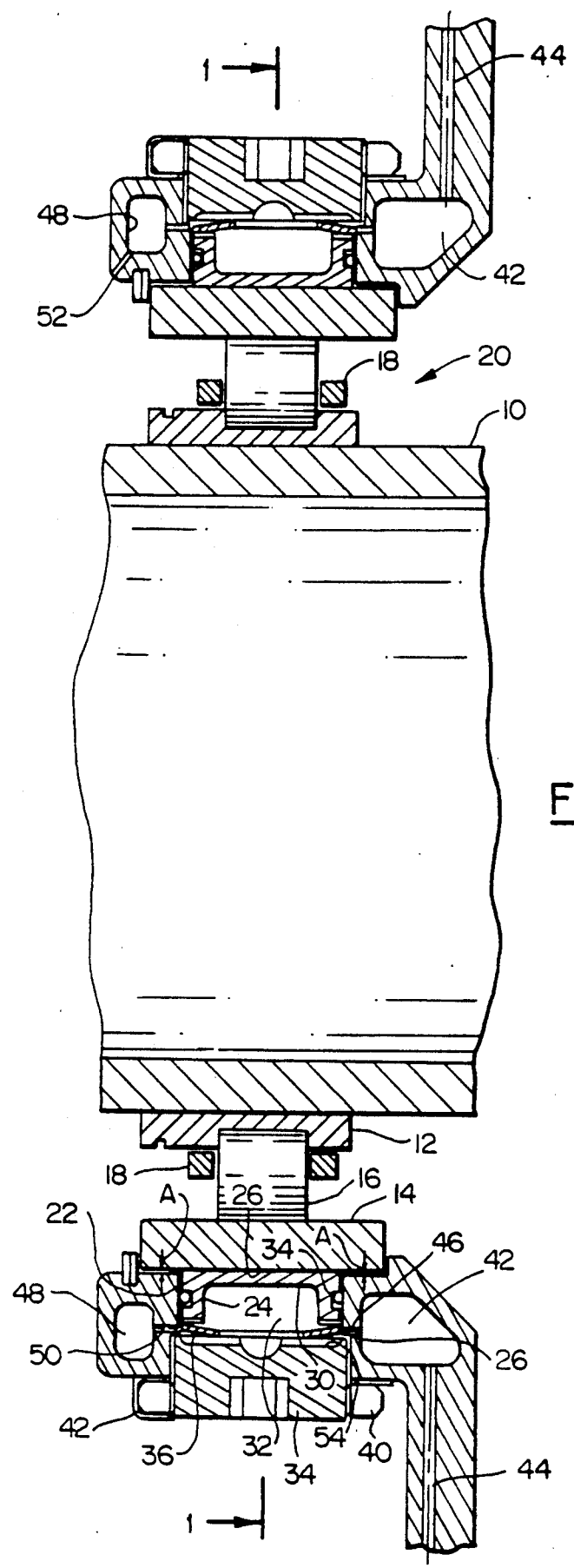
FIG. 2 is a sectional view taken through lines 2—2 of FIG. 1.

As best seen in FIGS. 1 and 2, the invention in its preferred embodiment is shown with a bearing support system for a rotating shaft that consists of the shaft 10 and roller bearing 11 having an inner race 12, an outer race 14 and a plurality of circumferentially spaced rollers 16 sandwiched between outer race 14 and inner race 12. Cage 18 serves to provide the spacing between rollers. The bearing is supported to the bearing housing generally indicated by reference numeral 20 as shown in schematic fashion.

What has been just described is a typical radial bearing used in gas turbine engines. In accordance with this invention, a plurality of equally spaced cylindrically shaped chambers 22 formed in housing 20 circumscribe the bearing and each chamber carries a reciprocating piston 24 slideably mounted in each chamber 22. The outer face 26 of piston 24 bears against the outer surface of outer race 14.

As is apparent, from the foregoing, piston 24 essentially divides chamber 22 into two portions, the portion being occupied by piston 24 and the other portion facing the inner face 30 of piston 24 and together with the cylinder wall define sub-chamber 32. A suitable seal 34 which may take the form of an elastomeric "O" ring, "U" ring, metal piston ring or the like, fits into a groove that circumscribes the piston 24 and prevents leakage between piston 24 and the cylinder wall.

The end of sub-chamber 32 is blocked off by plug 34 suitably threaded into the threads formed in the wall of cylinder in housing 20 adjacent the outer end. A suitable spring 36, preferably a Belleville washer type, disposed between the end of plug 34 and face 26 of piston 24 provides a spring force that centers bearing 11 and keeps the piston 24 in contact with the outer race. Obviously, adjusting the height of plug 34 by screwing it in and out of the cylinder varies the spring compression and consequently changes the spring force. The plug can be locked in the desired position at a prerequisite preload by a suitable nut 40 and washer 42 or such similar means.

As would be apparent to one ordinarily skilled in this art, the preload can be obtained by other means, such as by utilizing different classes of springs, different thickness, heights and the like.

Figure 4:
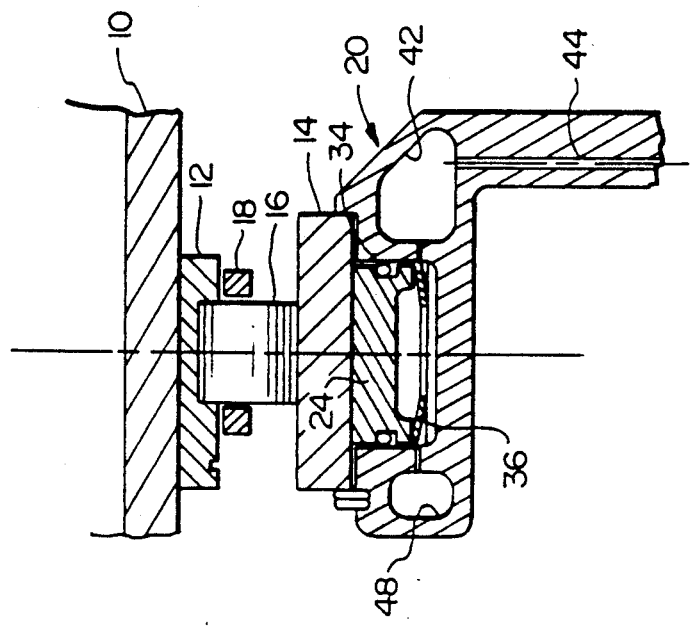
FIG. 4 is a partial section view of another embodiment without the plug.
Figure 3:
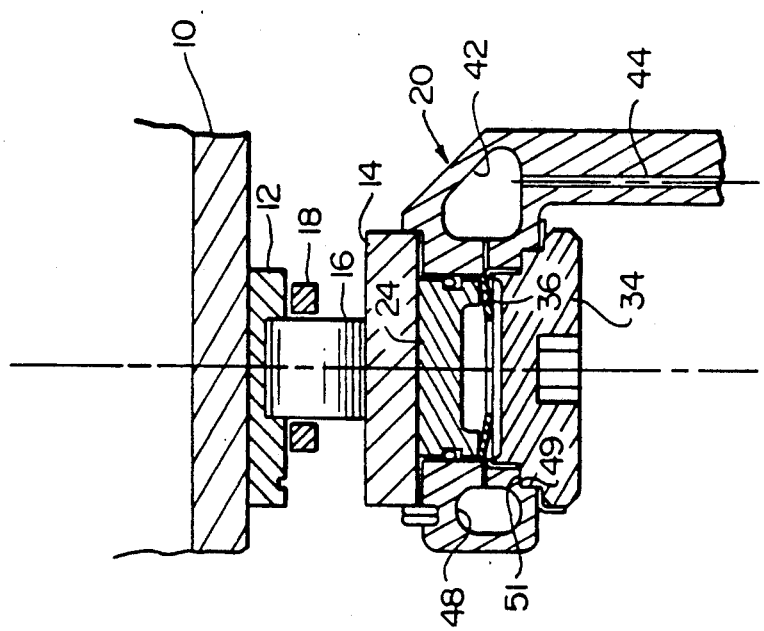
FIG. 3 is a partial sectional view of another embodiment of this invention showing a fixed displaced plug.

As noted in FIGS. 3 and 4, this invention comtemplates utilizing a fixed opening for receiving the spring and hence preselects the spring rate. For example, in FIG. 3, plug 34, pre-formed with shoulder 49 seats against the complimentary shoulder 51 formed in housing 20 when assembled. (Like reference numerals reference like parts in all the FIGS.)

In FIG. 4 housing 20 is configured so that the outer end of the cylinder is closed which, like the embodiment in FIG. 3 pre-ascertains the dimension of the spring.

Fluid, such as damping oil, is supplied under pressure from a source (not shown) to annular manifold 42 formed in housing 20 via passageway 44 and is admitted to sub-chamber 32 through drilled holes 46. This piston 24 reacting to the orbiting motion of the outer race 14 which is excited by the vibrating energy caused by the rotating shaft, behaves as a pump and forces the oil out of sub-chamber through the drilled restrictive passageway 50, communicating with manifold 48. This oil in manifold 48 is bled out of the damping system via drilled passageway 52. The oil being forced out of and into sub-chamber 32 dampens the vibrating energy.

Slots 54 may be formed in the head of plug 34 and a skirt may be employed with piston 24 to enhance the flow of oil around spring 36.

As is apparent from the foregoing, the squeezing of oil out of sub-chamber 32 and the continuous supply of oil keeping the volume of sub-chamber 32 completely filled effectuates damping in a similar manner as a dashpot damper. The bearing loads forcing the piston 24 outward is counteracted by the loads provided by the oil acting on the face 26 of piston 24 and the spring load provided by spring 36.

The damping system can be optimized or tuned by the proper sizing of the inlet passages 44 which is larger than the restricted outlet passage 50 and the use of check valves on the inlet and outlet oil circuit.

The gap illustrated by reference letter A between the outer surfaces of outer race 14 and the inner diameter of housing 20 serves as a stop for the outer race and affords a simple solution to controlling the design of the outer race stops.

Figure 5:
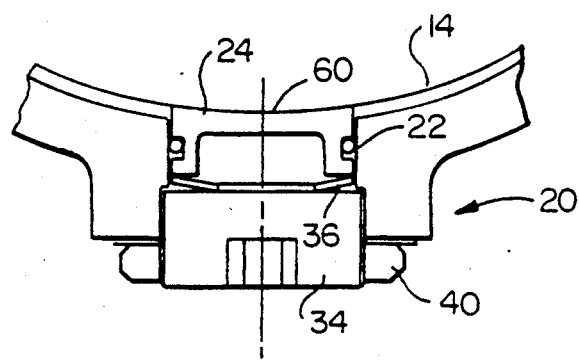
FIG. 5 is a partial sectional view showing a contoured face of the piston.
Figure 6:
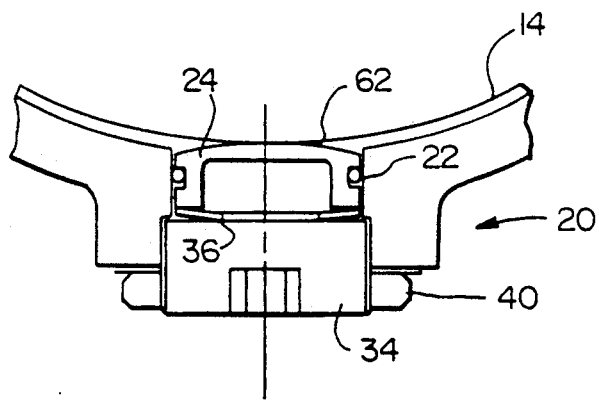
FIG. 6 is a partial sectional view showing another version of the contoured face of the piston.
Figure 7:
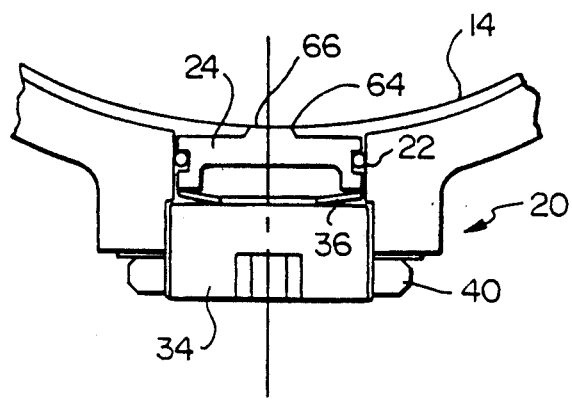
FIG. 7 is a partial sectional view showing still another version of the contoured face of the piston.

FIGS. 4, 5 and 7 are exemplary of the types of pistons that can be employed with this invention. In FIG. 4 the face 60 of piston 24 is contoured to complement the contours of the outer surface of outer race 14. In FIG. 5 the face 62 of piston 24 is dome shaped and contacts the outer race at the tangent of the respective arcs of the outer race and dome. And in FIG. 6 a protrusion 64 extends axially from the end of piston 24 and face 66 on protrusion 64 contacts outer race 14.

What has been disclosed by this invention is a relatively simple, compact damping system that offers the following advantages and differences relative to a curved beam damper system as of the type disclosed in U.S. Pat. No. 4,213,661, supra, Utilization of Belleville springs allows for a more compact and less expensive design than achievable with curved beams. Furthermore, the Belleville spring allows for choice of linear, constant, or non-linear response by specifying a certain height to thickness ratio.

Preload/centering force on the bearing is adjustable either by using the threaded plug design or by changing classes of springs. This provides a distinct advantage over curved beams both during development and when making changes. The tolerance stackup on curved beams causes a wide variation in preload while the dashpot damper preload can be selected and adjusted. changes to curved beams require a detailed analysis and redesign customized for each application.

This invention accommodates more conventional machining techniques than curved beams. There are fewer critical dimensions and those that are required are easier to control.

This invention provides a simple easy to control outer race stop at two locations.

Contact area, oil volume, and oil are easily modified by altering the piston head shape, hollowing it, etc. Curved beams are difficult to modify since they are highly stressed structural members.

This piston/cylinder system is inherently easier to seal than the curved beam designs since it uses circular seals around a piston rather than "race track" seals in beam as disclosed in the aforementioned U.S. patent application.

The piston will act as an efficient pump as it moves in and out. Use of check valves and various passage designs will allow the system to be tuned for optimum oil flow and damping.

The flexibility in the dashpot system as taught by this invention allows for adaptation for various bearing applications as contrasted with the curved beam design must be customized for each application.

Although this invention has been shown and described with respect to detailed embodiments thereof, it will be understood by those skilled in the art that various changes in form and detail thereof may be made without departing from the spirit and scope of the claimed invention.

I claim:

1. Damper means for a bearing supporting a rotating shaft comprising wall means defining a plurality of radially extending cylindrically shaped chambers circumferentially disposed around said bearing, each chamber having a reciprocal piston having one end bearing against the outer race of said bearing, spring means disposed in said chamber bearing against one end of said reciprocal piston for urging said piston toward said outer race, a portion in each of said chambers defining a sub-chamber for receiving fluid, means including a restriction for flowing fluid out of said sub-chamber when said reciprocal piston is urged by said outer race in a direction away from said outer race and a fluid inlet into said sub-chamber having an opening larger than said restriction to maintain the pressure of the fluid in said sub-chamber at a predetermined value.

2. Damper means as claimed in claim 1, wherein said spring means is a Belleville washer.

3. Damper means as claimed in claim 2 including means to vary the spring rate of said Belleville washer.

4. Damper means as claimed in claim 3 wherein said chamber is opened on one end, a retractable plug threadably mounted on said one end having an inner face bearing against the end of said piston whereby said plug is adjustable to vary the spring rate of said Belleville washer.

5. Damper means as claimed in claim 1 including sealing means adjacent the side wall of said chamber preventing the leakage of fluid from said sub-chamber to said outer race.

6. Damper means as claimed in claim 5 wherein said sealing means is supported in an annular groove in said piston.

7. Damper means as claimed in claim 2 wherein said chamber is opened at one end remote from said piston, a retractable plug mounted in said one end and a shoulder formed on the outer periphery of said plug engaging a complementary should formed in said wall means to constrain the length said plug is inserted into said chamber.

8. Damper means as claimed in claim 2 wherein said piston includes an end face bearing against said outer race, said end face being contoured in a concaved surface complementing the contoured shaped surface of said outer race.

9. Damper means as claimed in claim 2 wherein said piston includes an inner face having a convex shaped surface bearing against the outer surface of said outer race.

10. Damper means as claimed in claim 2 wherein said piston includes an inner face an axially extending reduced diameter portion projecting beyond said inner face and bearing against the outer surface of said outer race.

11. For a gas turbine engine having a rotating shaft, bearing means including an outer race rotatably supporting said shaft, damper means including wall means defining a plurality of radially extending cylindrical chambers circumferentially spaced around said outer race, each chamber having a reciprocating piston having one end bearing against the surface of said outer race and dividing said chamber into a sub-chamber, means for feeding pressurized fluid in said sub-chamber for acting on the opposite end of said piston, a restricted passageway communicating with said sub-chamber for flowing fluid out of said sub-chamber at a predetermined pressure, spring means bearing against said opposite end urging said piston toward said outer race and means for continuously supplying pressurized fluid to said sub-chamber.

12. For a gas turbine engine as claimed in claim 11 wherein said spring means is a Belleville washer.

13. For a gas turbine engine as claimed in claim 12 including means for varying the spring rate of said Belleville washer.

* * * * *